United States Patent [19]
Carpenter

[11] 3,958,401
[45] May 25, 1976

[54] GRASS COLLECTION APPARATUS
[75] Inventor: Eugene C. Carpenter, Galesburg, Ill.
[73] Assignee: Outboard Marine Corporation, Waukegan, Ill.
[22] Filed: Sept. 5, 1974
[21] Appl. No.: 503,348

[52] U.S. Cl. .............................. 56/202; 56/320.2
[51] Int. Cl.² ..................................... A01D 35/22
[58] Field of Search ............... 56/202, 13.4, 320.2, 56/16.6

[56] References Cited
UNITED STATES PATENTS

| | | | |
|---|---|---|---|
| 3,191,370 | 6/1965 | Epstein | 56/202 |
| 3,624,989 | 12/1971 | Gatheridge | 56/202 |
| 3,722,192 | 3/1973 | Corbett | 56/202 |
| 3,802,173 | 4/1974 | Opitz | 56/202 |

*Primary Examiner*—Louis G. Mancene
*Assistant Examiner*—J. N. Eskovitz
*Attorney, Agent, or Firm*—Michael, Best & Friedrich

[57] ABSTRACT

Disclosed herein is a lawn mower comprising a wheeled structure adapted for travel over the ground and a grass clipping collection apparatus including a grass catcher supporting frame supported by the structure and including an upper frame supporting a cover and a lower frame portion supporting an inner, disposable, air impervious, grass clipping collection bag, and an outer, flexible, air porous bag supported by the upper frame portion in position to enclose and additionally support the collection bag and including a flap facilitating removal of the collection bag from the lower frame portion and the outer bag.

13 Claims, 9 Drawing Figures

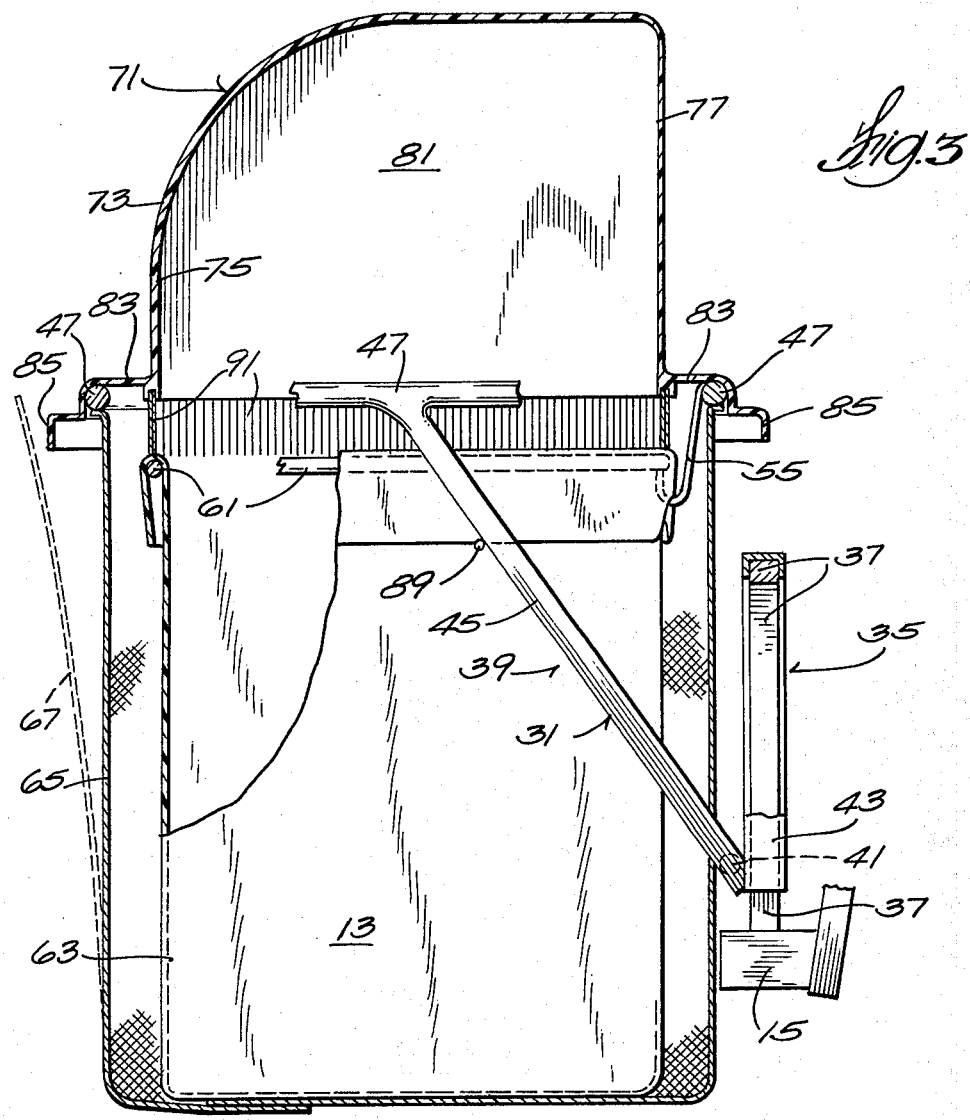
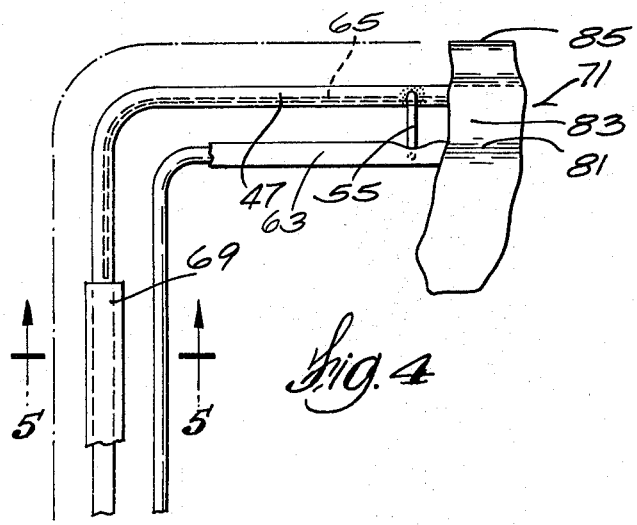
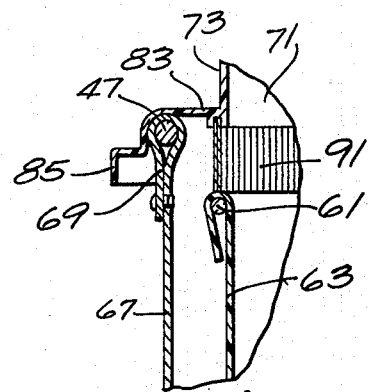

GRASS COLLECTION APPARATUS

BACKGROUND OF THE INVENTION

The invention relates generally to rotary lawn mowers including both the riding type and the walk-behind type and to grass clipping collecting apparatus therefor. More particularly, the invention relates to grass clipping collection apparatus including a disposable collection bag of air impervious plastic material.

SUMMARY OF THE INVENTION

The invention provides a lawn mower comprising a wheeled structure adapted for travel over the ground and a grass clipping collection apparatus including a grass catcher supporting frame supported by the sturcture and including a first frame portion adapted to support a cover and a second frame portion adapted to support a grass clipping collection bag, and a bag supporting structure supported by the first frame portion in position to enclose and additionally support the collection bag and including means for facilitating removal of the collection bag from the second frame portion and the bag supporting structure.

In further accordance with the inveintion, the collection bag can be a flexible, air impervious, disposable bag and the bag supporting structure can comprise a flexible, air-porous outer bag and the means facilitating bag removal can comprise a rearwardly located flap.

In still further accordance with the invention, the grass catcher supporting frame can be removably supported by the wheeled structure and the first frame portion can be of endless construction and the second frame portion can also be of endless construction, can be supported from and below the first frame portion, and can be of lesser dimensions when seen from above.

Further in accordance with the invention, there is also provided a grass clipping discharge chute adapted to extend from a blade housing and a cover communicating with the discharge chute and having a part removably received on the first frame portion. Preferably there is also provided means for attachment of the cover to the frame so that the cover is mounted on the first frame portion in substantially air tight engagement.

In addition, it is preferred to include brush means on one of the cover and the frame and extending between the cover and the second frame portion for guiding clippings from the cover to the collection bag while permitting excape of air through the brush means.

The cover preferably also includes a downwardly and forwardly concave rear wall having a lower substantially vertically extending portion and a forward wall in communication with the discharge chute to provide for smooth flow from the chute and along the rear wall and into the collection bag. In addition, the cover preferably includes a skirt standing outwardly and downwardly from the cover part resting on the first frame portion.

The invention also provides a grass catcher supporting frame including a bracket which is of inverted "U" shape in one plane and which includes two spaced legs, and a cross bar connecting the legs. The cross bar is channel-shaped in a plane perpendicular to said one plane and has spaced arms extending in the same direction as the legs. The legs are channel-shaped in facing relation to each other in a plane perpendicular to said one plane. Also included in the frame is means connected to the bracket for supporting a grass clipping collection bag.

The invention further provides a lawm mower having a wheeled frame, and a vertically extending inverted "U" shaped member which extends rigidly from the frame which includes two laterally spaced upright posts connected by a cross beam and which receives the bracket with the cross beam received in the cross bar and with the upright posts respectively received in the legs.

One of the principal features of the invention is the provision of a grass clipping collection apparatus including a disposable inner bag supported by an outer bag or sling.

Another of the principal features of the invention is the provision of a grass clipping collection apparatus including a supporting frame including an upper endless frame portion which supports an outer bag or sling and a hood, and an adjacent lower endless frame portion which releasably supports a disposable bag employed to receive the grass clippings being collected.

Another of the principal features of the invention is the provision of an inner disposable grass clipping collecting bag and an outer bag which supports the inner bag and which includes flap means providing easy removal of the inner disposable bag when the flap is opened.

Another of the principal features of the invention is the provision of a grass clipping collection apparatus including an inner air impervious disposable bag and an outer bag or sling which is air porous and which supports the inner bag.

Another of the principal features of the invention is the provision of a grass clipping collection apparatus including a hood or cover which provides an expansion zone for an incoming stream of the air and grass clippings and which guides the settling of the clippings into a collection bag.

Another of the principal features of the invention is the provision of means between a hood and an air impervious grass clipping collecting bag for guiding the clippings into the bag while simultaneously permitting excape of air.

Still another of the principal features of the invention is the provision of a grass clipping collection apparatus including a supporting frame which can be readily connected to and removed from a riding lawn mower or a walk-behind lawn mower.

Other features and advantages of the invention will become known by reference to the following drawings, general description and claims.

IN THE DRAWINGS

FIG. 3 is an enlarged view, partly broken away and in section, of a portion of the lawn mower shown in FIG. 1.

FIG. 4 is a fragmentary and partially broken away plan view of a portion of the structure shown in FIG. 3.

FIG. 5 is a sectional view taken along line 5—5 of FIG. 4.

Figure 1:
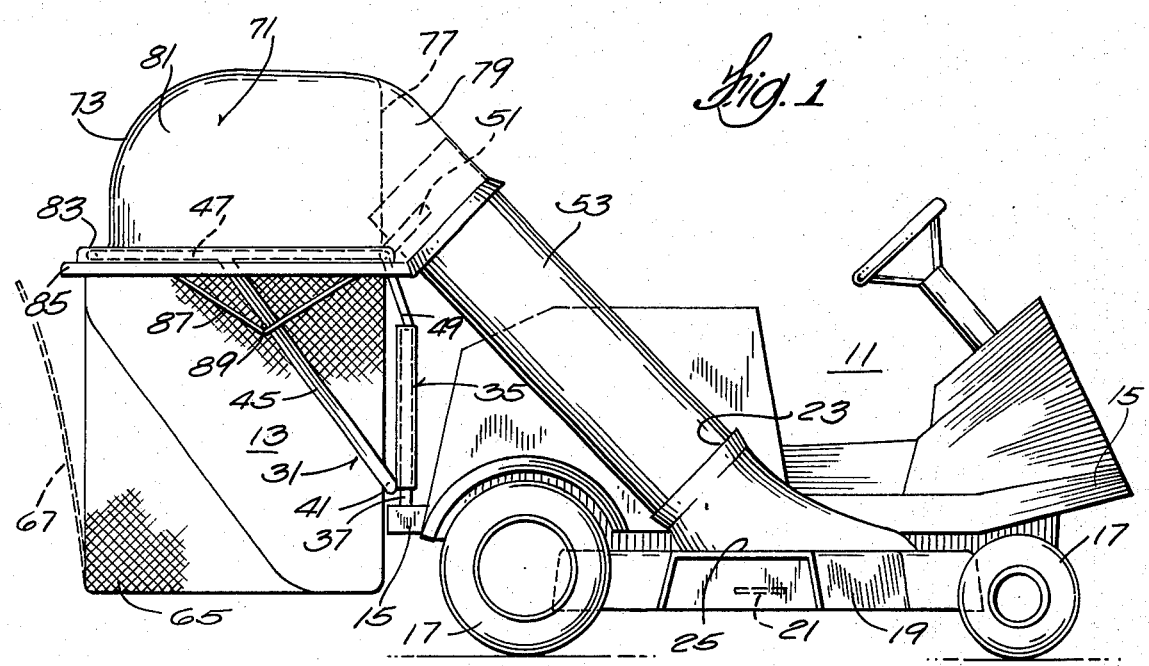
FIG. 1 is a side elevational view of a rotary riding lawn mower embodying various of the features of the invention.
Figure 2:
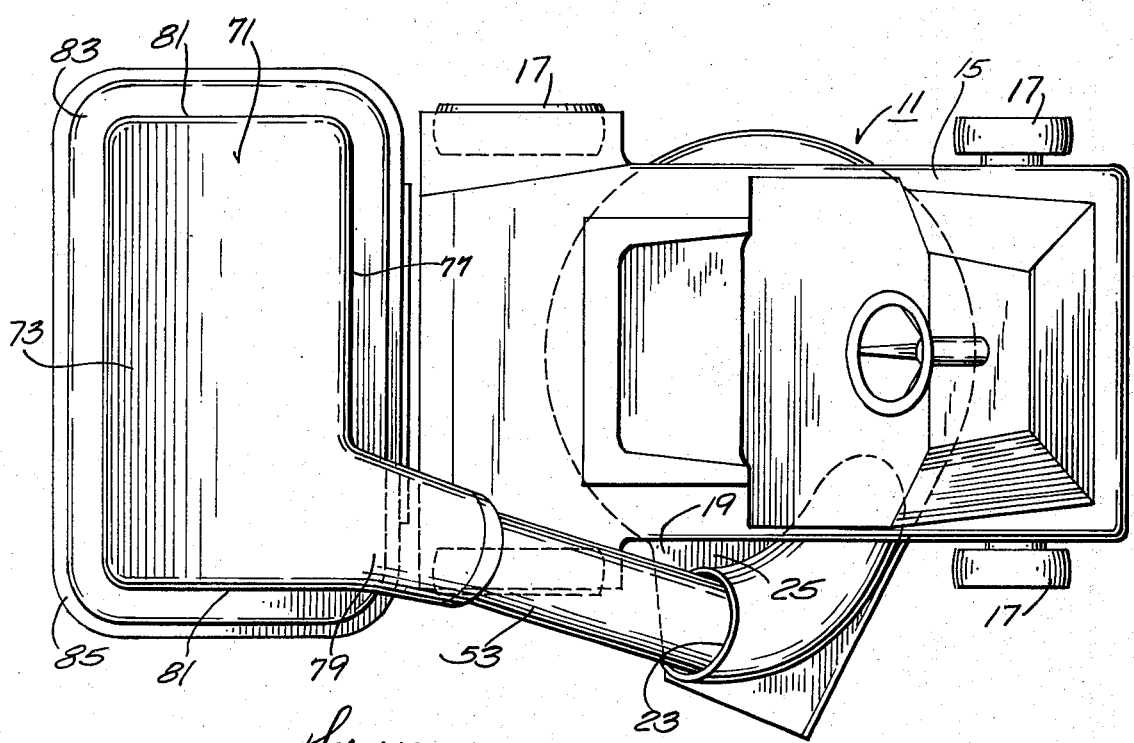
FIG. 2 is a top plan view of the lawn mower shown in FIG. 1.

Before explaining the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein is for the purposes of description and should not be regarded as limiting.

GENERAL DESCRIPTION

Shown in FIGS. 1 through 5 of the drawings is a riding rotary lawn mower 11 including a grass clipping collection apparatus 13 in accordance with the invention. The lawn mower 11 includes a frame or structure 15 which is carried by three or more ground engaging wheels 17 and which supports a rotary blade housing 19 enclosing a rotary cutter blade 21 which is shown in dotted outline in FIG. 1 and which is driven by a source of power (not shown) also carried by the frame or structure 15. The cutter blade 21 preferably includes, at its ends, wings or upstanding vanes (not shown) adapted to generate an air flow capable of entraining and conveying grass clippings. In addition, the blade housing 19 includes a discharge opening 23 which, preferably, communicated with the blade housing 19 through the top deck 25 of the housing 19.

In accordance with the invention, the grass clipping collection apparatus 13 includes a support frame 31 which is preferably removably mounted on the lawn mower structure or frame 15. More specifically, in the illustrated construction, the support frame 31 includes an inverted "U" shaped bracket which is of downwardly open channel-shaped form and which is adapted to be removably received over an inverted "U" shaped pipe or support 37 fixed to the structure or frame 15. More specifically, the bracket 35 is of inverted "U" shape in one plane and includes two spaced legs 43 and a cross bar connecting the legs, which cross bar is channel-shaped in a plane perpendicular to said one plane and has spaced arms extending in the same direction as the legs, and which legs are channel-shaped in facing relation to each other in a plane perpendicular to said one plane.

The support 37 extends rigidly from the frame 15 and includes two laterally spaced upright posts connected by a cross beam. When assembled, the bracket 35 is received on the support or pipe 37 with the cross beam received in the cross bar and with the upright posts respectively received in the legs. Accordingly, all relative movement therebetween is prevented except for vertical bracket movement relative to the support 37 permitting assembly and disassembly of the bracket 35 and the support 37. While the bracket 35 and support 37 have been described as "U" shaped and channel-shaped, it is not necessary that said shapes be rectangular so long as the bracket 35 is receivably over the support 37 as described. Thus "U" shape and channel-shape includes a concavely downwardly open shape.

Extending from the bracket 35 is a "U" shaped member 39 which includes a cross-bar 41 welded to the lower part of the vertical legs 43 of the bracket 35 and which further includes two laterally spaced upstanding leg portions 45 which extend rearwardly and upwardly. At their upper ends, the leg portions 45 are welded to an upper endless or annular frame portion 47 which is preferably generally rectangular in shape, having a greater transverse width than fore and aft length, and which is horizontally disposed when the support frame 31 is mounted on the lawn mower frame or structure 15. Extending between the forward part of the upper frame portion 47 and the top of the bracket 35 (See FIG. 1) is a brace member 49. In addition, the upper frame portion 47 supports a "U" shaped bracket 51 adapted to support a discharge chute 53 still to be described.

Supported by a series of hangers 55 extending from the upper frame portion 47 (See FIGS. 3 and 5) is an endless or annular lower frame portion 61 which is located in generally parallel relation to and below the upper frame portion 47, which is preferably generally of rectangular form, which has somewhat less length and width as compared to the upper frame portion 47, and which is adapted to support a disposable grass collection bag 63 preferably of air impervious plastic material. In the illustrated construction, the circumference of the lower frame portion 61 is such as to snugly accept the top of a common 30 gallon plastic bag for support of the bag 63 from the frame 31. If desired the grass collection bag 63 can be clamped between the lower frame portion 61 and one or more pads (not shown) which are preferably resilient and which are mounted on the cover 71 still to be described in such manner as to grip the bag 63 when the cover 71 is attached to the frame 31.

Supported from the upper frame portion 47 is a bag supporting structure which additionally supports the collection bag 63 and which includes means facilitating removal of the collection bag from the frame 31 and the bag supporting structure. While various arrangements could be employed, in the illustrated construction, the bag supporting structure comprises an outer, flexible porous bag or sling 65 which generally supports the inner disposable bag 63 and, accordingly, under normal usage, prevents unintended removal of the top of the disposable bag 63 from the lower frame portion 61. Any suitable means can be employed to connect the outer bag or sling 65 from the upper frame portion 47.

In order to facilitate removal of the disposable or inner bag 63 from the outer bag 65, a major portion of the rear part of the outer bag or sling 65 can comprise a flap 67 which is shown in dotted outline in FIG. 1 and which extends from adjacent the bottom of the outer bag 65 and which includes an upper part 69 readily removably connected to the upper frame portion 47 separately from the connection of the remainder of the outer bag or sling 65 to the upper frame portion 47. If desired, the flap 67 can be wholly connectable to the remainder of the bag or sling 65. Thus, when it is desired to remove the disposable bag 63, the upper part 69 of the flap 67 is disconnected from the upper frame portion 47 and/or from the remainder of the bag 65 so as to more or less fully open the rear of the outer bag 65 to facilitate removal there through of the clipping ladden disposable bag 63.

Any suitable means can be provided for releasably connecting the flap 67 to the upper frame portion 47 or to the remainder of the outer bag 65. While it is preferred that the outer bag or sling 65 be in the form of an air porous bag in order to obtain the advantage of collecting dust and dirt and thereby reduce the exposure of the operator to such dust and dirt, it is within the scope of the invention to use a more or less open sling. It is also in accordance with at least a part of the invention to employ a rigid outer disposable bag supporting structure so long as access means are provided for facilitating disposable bag removal.

Removably mounted on the top of the frame 31 is a cover or blood 71 which includes a rearward wall 73 having a substantially vertical lower portion 75 generally aligned with the rearward inside edge of the lower frame portion 61 and which extends upwardly and forwardly, in forwardly and downwardly concave relation. At its upper end, the rearward wall 73 merges or blends with a forward wall 77 which is generally vertically extending and which includes (see FIG. 2) an inlet port 79 communicating with the grass discharge chute 53 extending upwardly from the grass clipping discharge port 23 communicating with the housing 19 through the top deck 25 of the blade housing 19. Above the upper frame portion 47, the cover 71 also includes two generally vertical and laterally spaced side walls 81 which extend between the forward and rearward walls 77 and 73 respectively. The cover 71 further includes, at the bottom of the forward, rearward, and side walls, a horizontally extending peripheral flange or part 83 which rests on the upper frame portion 47 to support the cover 71, and a peripheral skirt 85 which extends outwardly and downwardly from the flange 83 so as to direct outwardly and downwardly air exiting through the space between the hood 71 and the lower frame portion 61, i.e., from between the cover or hood 71 and the disposable bag 63.

Any suitable means can be employed for removably holding the cover or hood 71 on the frame 31. In the construction illustrated in FIGS. 1 through 5, such means comprises, on each side, an elastic member 87 which extends from the hood 71 and which can be connected to hooks 89 on the sides of the support frame 31.

Means are provided for guiding clippings and debris from the cover 71 into the disposable bag 63 and, at the same time, for affording escape of air from the inside of the grass clipping collecting apparatus 13. While various arrangements could be employed, in the construction illustrated in FIGS. 1 through 5, such means comprises (See FIGS. 3 and 5) bristle or brush means 91 which is secured to the hood or cover 71 and which extends from the lower portion of the forward, rearward, and side walls of the hood 71 into adjacent relation to the lower frame portion 61 when the hood or cover 71 is supported on the frame 31. Accordingly, grass clippings, and debris are guided into the disposable bag 63, but air is permitted to escape into the outer bag 65 which is porous to afford escape of the air while generally collecting dust and dirt which may be entrained with the air.

In operation, grass clippings are conveyed by a stream of air up the discharge chute 53 and are deposited into an expansion zone generally defined by the hood 71. Upon entering the hood 71, the air velocity is diffused and the grass clippings follow the curve of the rearward wall 73 and then drift into the disposable bag 63. Movement of the mower 11 along the ground causes shaking of the clippings in the disposable bag 63 and thereby to gradually settle in the disposable bag 63. The air which conveys the grass clippings escapes through the brush or bristle means 91 between the cover 71 and the lower frame portion 61 and exits outwardly through the outer bag 65 under the skirt 85 of the cover 71.

When the disposable bag is full, the flap 67 of the outer bag 65 can be disconnected from the upper frame portion 47 or from the remainder of the outer bag 65 to permit easy access through the rear of the outer bag 65 to the disposable bag 63 for removal thereof from the lower frame portion 61 and from the sling or outer bag 65.

With the hood 71 removed, a new disposable bag can thereafter be readily connected to the lower frame portion 47 and the flap 67 can again be secured to the upper frame portion 61 or to the remainder of the outer bag 15. Replacement of the cover 71 on the frame 31 in communication with the discharge chute 53 again readies the mower 11 for use.

Shown in FIGS. 6 through 9 is a walk-behind rotary mower 111 which embodies various of the features of the invention and which includes a grass clipping collection apparatus 113 which, in many respects, is similar to the grass clipping collection apparatus 13 shown in FIGS. 1 through 5.

The mower 111 includes a wheel supported structure in the form of a blade housing 119 having a grass clipping discharge opening 123 in the top deck 125 thereof. Also extending upwardly and rearwardly of the top deck 125 thereof is a handle 130 which, in series, includes upper and lower inverted "U" shaped handle parts 132 and 134, respectively, with the upper handle part 132 being connected to the upper end of the lower handle part 134. Of course, various handle constructions can be employed.

The grass clipping collection apparatus 113 is removably mounted on the rear part of the top deck 125 and extends between the laterally spaced legs 136 of the lower handle part 134. Included in the grass clipping collection apparatus 113 is a supporting frame 131 including two laterally spaced upright rods or legs 143 which extend into guide holes 138 in the top deck 125 and which are vertically supported by the top deck 125, together with a bale member 139 which includes two laterally spaced "V" shaped side portions 145 each including forward and rearward legs 146 and 148, respectively, connected at their lower ends to form an apex or junction 150 which is adapted to rest on the top deck 125 rearwardly of the support of the vertical rods 143. The upper ends of the rearward legs 148 include vertical portions 152 and the mid-sections of the forward legs 146 are fixedly secured by welding or otherwise to the the adjacent upright rods 143. Extending from the top of the forward legs 146, forwardly of the upright rods 143, a cross-portion 154 of the bale member 139, which cross-portion 154 transversely unifies the frame 131. If desired, a cross-member (not shown) can be secured to the bale member side portions 145 adjacent to the lower junction 150, or else where.

Figure 6:
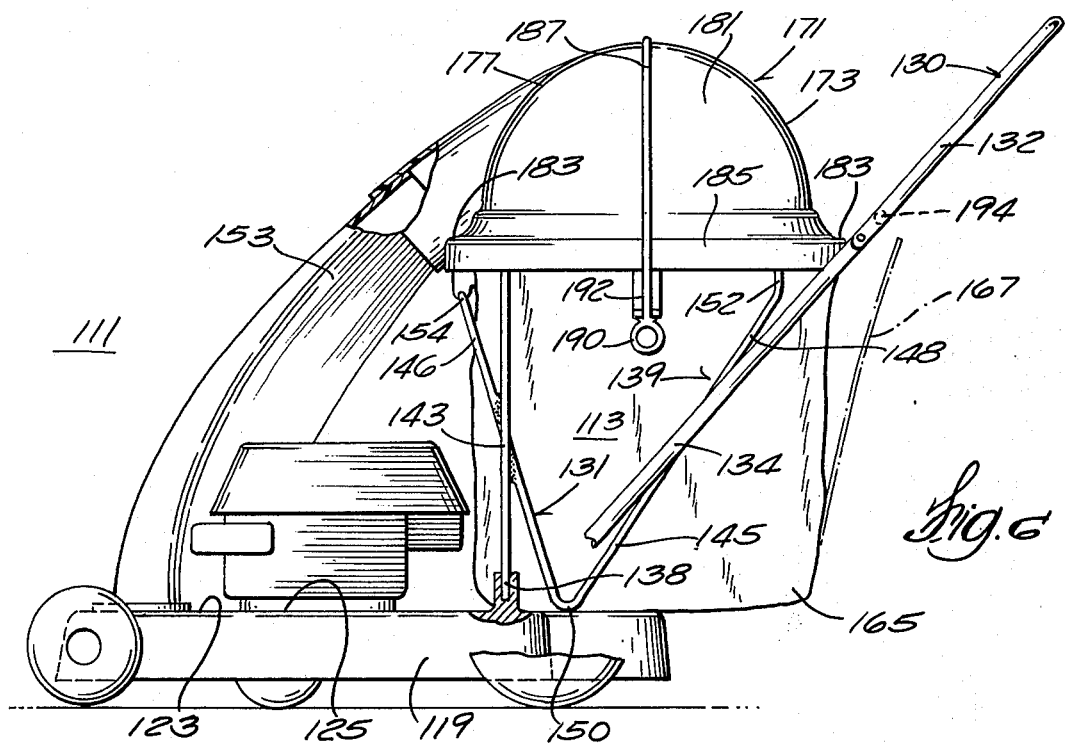
FIG. 6 is a side elevation view, partially broken away and in section, of another embodiment of a rotary lawn mower incorporating various of the features of the invention.
Figure 7:
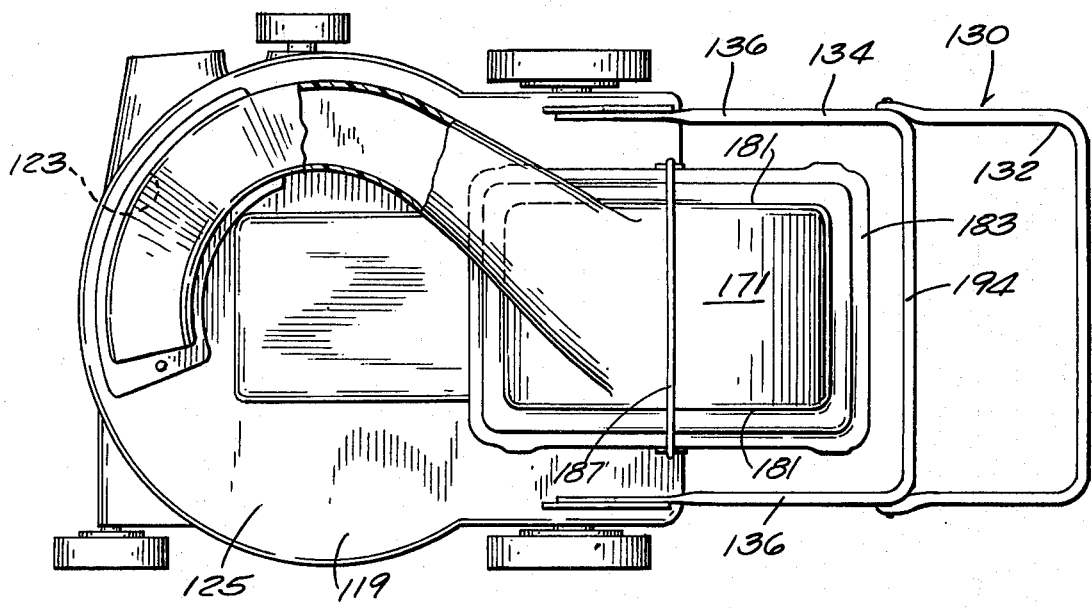
FIG. 7 is a partially broken away, top plan view of the lawn mower shown in FIG. 6.
Figure 8:
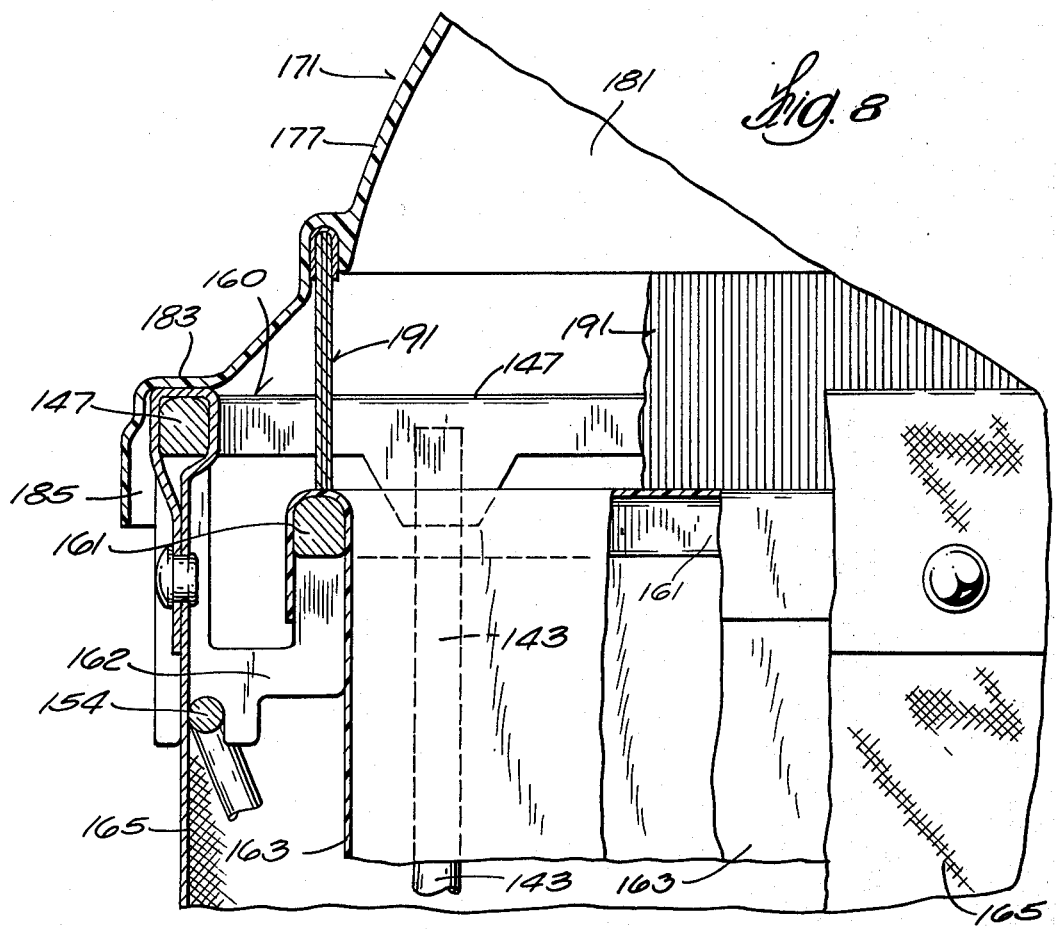
FIG. 8 is an enlarged fragmentary view, partially broken away and in section, of a portion of the lawn mower shown in FIG. 6.
Figure 9:
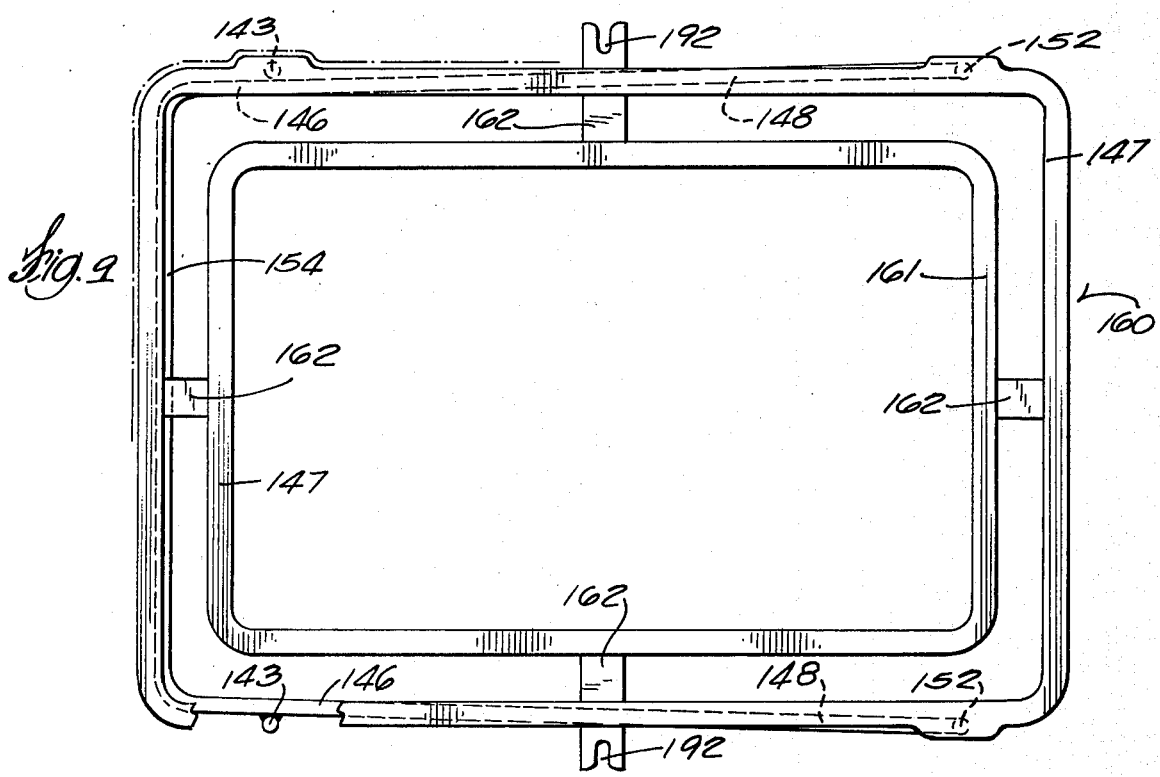
FIG. 9 is a partially broken away top plan view of the grass collection apparatus incorporated in the lawn mower shown in FIG. 6 and with the hood or cover removed.

Received on the top of the rearward legs 148 and on the top of the rods 143 is (See FIGS. 8 and 9) a frame part 160 including an upper endless or annular frame portion 147 which in the construction illustrated FIGS. 6 and 9, is preferably of generally rectangular form, and which receives the tops of the rearward legs 148 and of the rods 143, and which is connected by a plurality of links or hangers 162 to a lower endless or annular frame portion 161 which is also preferably generally of rectangular formation, and which has somewhat lesser width and length than the upper frame portion 147. The forwardly located link or hanger 162 is also adapted (as shown in FIG. 8) to engage the cross-portion 154 of the bale member 139 to further support the upper frame part 160. As compared to the grass clipping collection apparatus 13 shown in FIGS. 1 through 5, in the grass clipping collection apparatus 113, the fore and aft length of the generally rectangular upper frame portion 147 is of greater dimension than the width of the upper frame portion 147.

The grass clipping collection apparatus 113 fruther includes a cover or hood 171 which is adapted to rest on the upper frame portion 147 and which includes a downwardly and forwardly concave rearward wall 173, together with a downwardly and rearwardly concave forward wall 177 and laterally spaced and connected side walls 181. The forward wall 177 also communicates with a grass clipping discharge chute 153 extending upwardly from the grass clipping discharge opening 123 in the top deck 125. In addition, the hood 171 includes, as in the construction of the hood 71, a peripheral flange 183 and akirt 185.

As also in the grass clipping collection apparatus 13, the grass clipping collection apparatus 113 further includes brush or bristle or other means 191 for guiding flow of clippings and debris from the cover 171 into a disposable bag 163 removably connected to the lower frame portion 161, while simultaneously permitting escape of air from between the cover 171 and the disposable bag 163.

Any suitable means can be employed to connect the cover or hood 171 to the frame part 160. In the grass clipping collection apparatus shown in FIG. 113, such means comprises an elastic member 187 which extends transversely over the top of the cover 171 and which, at its ends, includes enlarged portions 190 removably retained by suitable notches 192 formed in the frame part 160.

As in the grass clipping collection apparatus 13 of FIGS. 1 through 5, the apparatus 113 includes an outer bag or sling 165 which is suitably supported from the frame part 160 and which, at the rear, includes a part or flap 167 which is shown in dotted out line in FIG. 6 and which is separately and detachably connected to the rear transverse part of the upper frame portion 147 or the remainder of the outer bag or sling 165 solely at the bottom thereof or along a side thereof. If desired, the flap 167 can be additionally vertically detachably connected to the remainder of the bag or sling by zipper means or by snap buttons or any other suitable means.

It is noted that the frame part 160 extends slightly below and forwardly of the cross-piece 194 of the lower handle part 134.

Operation of the grass clipping collection apparatus 113 shown in FIGS. 6 through 9 is substantially the same as that of the grass clipping collection apparatus 13 shown in FIGS. 1 through 5. Specifically, in operation, the top portion of the disposable bag 163 is arranged around the lower frame portion 161 and, when filled with clippings and debris, can be readily removed by opening of the flap 167 and by removal of the disposable grass clipping bag 163 through the resulting access opening in the outer bag 165 and from between and below the lower handle part 134 without interference by the handle 130. After such removal, a new disposable bag 163 can be attached to the lower frame portion 161 and thereafter the hood or cover 171 can be replaced and reconnected to the frame 131. After the flap 167 is closed, the grass clipping collection apparatus 113 can be thereafter employed in the collection of grass clippings and debris.

Various of the features of the invention are set forth in the following claims.

What is claimed is:

1. A lawn mower comprising a wheeled structure adapted for travel over the ground and a grass clipping collection apparatus including a grass catcher support frame supported by said structure and including a first frame portion adapted to support a cover and a second frame portion adapted to support a grass clipping collection bag, and a bag supporting structure supported by said first frame portion in position to enclose and additionally support the collection bag and including means for facilitating removal of the collection bag from said second frame portion and said bag supporting structure.

2. A lawn mower comprising a wheeled structure adapted for travel over the ground, a flexible, disposable grass collection bag, a grass catcher support frame supported by said structure and including a first frame portion adapted to support a cover and a second frame portion adapted to removable support said collection bag, and a bag supporting structure supported by said first frame portion in position to enclose and additionally support said collection bag and including means for facilitating removal of said collection bag from said second frame portion and said bag supporting structure.

3. A lawn mower comprising a wheeled structure adapted for travel over the ground and a grass clipping collection apparatus including a grass catcher support frame supported by said structure and including a first frame portion adapted to support a cover and a second frame portion adapted to support a grass clipping collection bag, and a bag supporting structure supported by said first frame portion in position to enclose and additionally support the collection bag, said bag supporting structure comprising a flexible air-porous outer bag including means for facilitating removal of the collection bag from said second frame portion and said bag supporting structure, said means facilitating bag removal comprising a rearwardly located flap.

4. A lawn mower comprising a wheeled structure adapted for travel over the ground and a grass clipping collection apparatus including a grass catcher support frame supported by said structure and including a first frame portion of endless construction and adapted to support a cover, and a second frame portion which is of endless construction, which is supported from and below said first frame portion and is of lesser dimensions when seen from above, and which is adapted to support a grass clipping collection bag, and a bag supporting structure supported by said first frame portion in position to enclose and additionally support the collection bag and including means for facilitating removal of the collection bag from said second frame portion and said bag supporting structure.

5. A lawn mower comprising a wheeled structure adapted for travel over the ground and a grass clipping collection apparatus including a grass catcher support frame removably supported by said wheeled structure, and including a first frame portion adapted to support a cover and a second frame portion adapted to support a grass clipping collection bag, and a bag supporting structure by said first frame portion in position to enclose and additionally support the collection bag and including means for facilitating removal of the collection bag from said second frame portion and said bag supporting structure.

6. A lawn mower comprising a wheeled structure adpated for travel over the ground and a grass clipping collection apparatus including a grass catcher support frame supported by said structure and including a first frame portion adapted to support a cover and a second frame portion adapted to support a grass clipping collection bag, a bag supporting structure supported by said first frame portion in position to enclose and additionally support the collection bag and including means for facilitating removal of the collection bag from said second frame portion and said bag supporting structure, a grass clipping discharge chute, and a cover communicating with said discharge chute and having a part removably received on said first frame portion.

7. A lawn mower in accordance with claim 6 wherein said cover is in substantially air tight engagement with said first frame portion.

8. A lawn mower in accordance with claim 6 wherein said cover includes means for attachment to said support frame and means bearing on said second frame portion when said cover is attached to said support frame so as to frictionally restrain movement of the collection bag relative to said second frame portion.

9. A lawn mower in accordance with claim 6 and further including brush means on one of said cover and said support frame and extending between said cover and said second frame portion for guiding clippings from said cover to the collection bag while permitting escape of air through said brush means.

10. A lawn mower in accordance with claim 6 wherein said cover includes a downwardly and forwardly concave rear wall having a lower substantially vertically extending portion and wherein said cover includes a forward wall in communication with said discharge chute to provide for smooth flow from said chute and along said rear wall.

11. A lawn mower in accordance with claim 6 wherein said cover rests on said first frame portion and includes a skirt extending outwardly and downwardly from said cover part.

12. A lawn mower in accordance with claim 1 wherein said support frame includes a bracket which is of inverted "U" shape in one plane and which includes two spaced legs and a cross bar connecting said legs, said cross bar being channel shaped in a plane perpendicular to said one plane and having spaced arms extending in the same direction as said legs, and said legs being channel-shaped in facing relation to each other in a plane perpendicular to said one plane.

13. A lawn mower in accordance with claim 12 and further including a vertically extending inverted "U" shaped member extending rigidly from said wheeled structure and including two laterally spaced upright posts connected by a cross beam and wherein said bracket is received on said member with said cross beam received in said cross bar and with said upright posts respectively received in said legs.

* * * * *

PO-1050
(5/69)

UNITED STATES PATENT OFFICE
CERTIFICATE OF CORRECTION

Patent No. 3,958,401            Dated May 25, 1976

Inventor(s) Eugene C. Carpenter

It is certified that error appears in the above-identified patent and that said Letters Patent are hereby corrected as shown below:

Column 2, line 3         "lawm" should be ---lawn---.

Column 5, line 15        "blood" should be ---hood---.

Column 7, line 27        "akirt" should be ---skirt---.

Column 8, line 30        "removable" should be ---removably---.

Column 9, line 5         "structure by said first frame" should be ---structure supporte by said first frame---.

Signed and Sealed this

Twenty-seventh Day of July 1976

[SEAL]

Attest:

RUTH C. MASON
Attesting Officer

C. MARSHALL DANN
Commissioner of Patents and Trademarks